United States Patent

Mueller

[15] 3,665,437

[45] May 23, 1972

[54] METHOD FOR ALIGNING MAGNETIC HEADS FOR USE IN RECORDING A MASTER DISK PACK

[72] Inventor: Francis E. Mueller, San Jose, Calif.

[73] Assignee: International Business Machines Corporation, Armonk, N.Y.

[22] Filed: June 22, 1970

[21] Appl. No.: 48,062

[52] U.S. Cl.......340/174.1 C, 179/100.2 CA, 179/100.2 MD

[51] Int. Cl.......................................G11b 5/46, G11b 21/10

[58] Field of Search...............340/174.1 C, 174.1 B, 174.1 J, 340/174.1 R; 178/6.6 DD; 274/4 H; 179/100.2 CA, 100.2 B, 100.2 S

[56] References Cited

UNITED STATES PATENTS

| | | | |
|---|---|---|---|
| 3,212,074 | 10/1965 | Daniels et al. | 340/174.1 J |
| 3,039,102 | 6/1962 | Fuller et al. | 179/100.2 CA |
| 3,550,102 | 12/1970 | Delarve et al. | 340/174.1 C |
| 3,534,344 | 10/1970 | Santana | 340/174.1 C |
| 3,479,664 | 11/1969 | Stuart-Williams | 179/100.2 S |

*Primary Examiner*—Bernard Konick
*Assistant Examiner*—Alfred H. Eddleman
*Attorney*—Hanifin and Jancin and R. W. Keller

[57] ABSTRACT

This invention discloses a method for aligning magnetic heads for use in recording a master disk pack. The steps comprise recording a signal for use in determining a reference track on each of a plurality of disks, assembling the disks on a hub so as to form a disk pack, and aligning a plurality of packwriting heads so that each head corresponds to the reference track.

1 Claims, 2 Drawing Figures

INVENTOR
FRANCIS E. MUELLER

BY Robert W. Keller
ATTORNEY

METHOD FOR ALIGNING MAGNETIC HEADS FOR USE IN RECORDING A MASTER DISK PACK

BACKGROUND OF THE INVENTION

1. Field of the Invention

This invention relates to recording a master disk pack and, more particularly, to methods for aligning the magnetic heads for use in the recording of a master disk pack.

2. Description of the Prior Art

A head-alignment disk pack is required as a standard for precisely aligning each of the read-write magnetic heads of each magnetic file used in any computer installation, thereby to assure interchangeability of any disk pack with any magnetic disk storage file. The head-alignment disk pack is generated by a single, precisely aligned magnetic file called a packwriter, which writes or records reference tracks on each surface of each disk in the head-alignment disk pack assembly. In order to accurately and uniformly adjust the plurality of heads of each and every disk file, the reference tracks of the head-alignment disk pack must ideally have the same diameter, thereby to provide an ideal reference cylinder. The packwriter itself is periodically aligned from the reference tracks of several precision master disk packs which are kept in a vault at the packwriter location, the master disk packs being generated just after the initial alignment of the packwriter in accordance with pre-master disk packs.

Prior packwriters have utilized a plurality of recording heads to record the reference cylinder on an assembled pre-master disk pack. However, these packwriters were deficient in writing an ideal cylinder, since such a cylinder could only be generated if each head of the packwriter had exactly the same radial position from the central axis of rotation of the assembled disk pack. Moreover, a complex optical instrument was required for measuring and adjusting the position of each head of the packwriter to attempt to achieve radial equality thereamong, which object was seldom achieved. Compounding the adjustment problem was the fact that one-half of the vertically spaced packwriter heads faced upward and half faced downward. Consequently, the use of a plurality of recording heads resulted in the recording of imperfect cylinders due to tolerance buildup.

SUMMARY OF THE INVENTION

An object of the present invention is to provide a method for aligning magnetic heads for use in recording a master disk pack comprising the steps of recording a signal for use in determining a reference track on each of a plurality of disks, assembling the disks on a hub so as to form a pre-master disk pack, and aligning a plurality of packwriting heads so that each head corresponds to the reference track.

In accordance with the preceding object, it is still another object to provide a method of the type set forth and further including the step of positioning a single magnetic recording head at a predetermined radius with respect to the center of the disk for recording the signal.

It is still a further object in accordance with the method as set forth to include the step of recording on the disks of an assembled disk pack with the aligned packwriter heads, thereby to create a master disk pack.

Further objects of the invention pertain to the particular steps of the method and several features thereof whereby the above-outlined and additional operating methods thereof are attained.

The invention both as to its organization and method of operation, together with further objects and advantages thereof, will best be understood with reference to the following specification taken in connection with the accompanying drawing.

DETAILED DESCRIPTION OF THE PREFERRED EMBODIMENT

Figure 1:
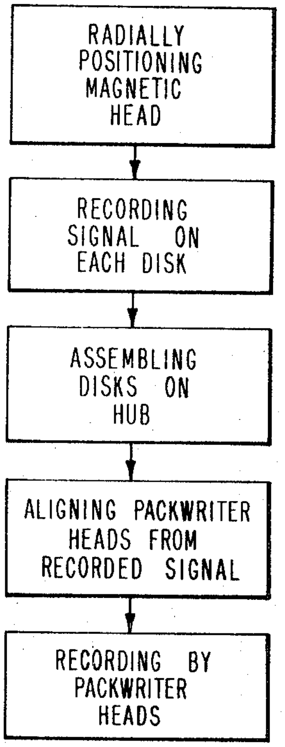
FIG. 1 is a block diagram illustrating the several steps of the method embodied in this invention for aligning magnetic heads for use in recording a master disk pack.

Referring now to the drawings and, more particularly, to FIG. 1, there is shown a block diagram of a method for aligning magnetic heads for use in recording a master disk pack comprising the steps of positioning a single magnetic head at a predetermined radius with respect to the center of a disk, recording with that magnetic head a signal for use in determining a reference track on each of a plurality of disks, assembling the disks on a hub so as to form a pre-master disk pack, aligning a plurality of packwriting heads so that each head corresponds to the respective reference track on each disk of the pre-master disk pack, and recording on the disks of another assembled disk pack with the aligned packwriter heads, thereby to create a master disk pack.

Figure 2:
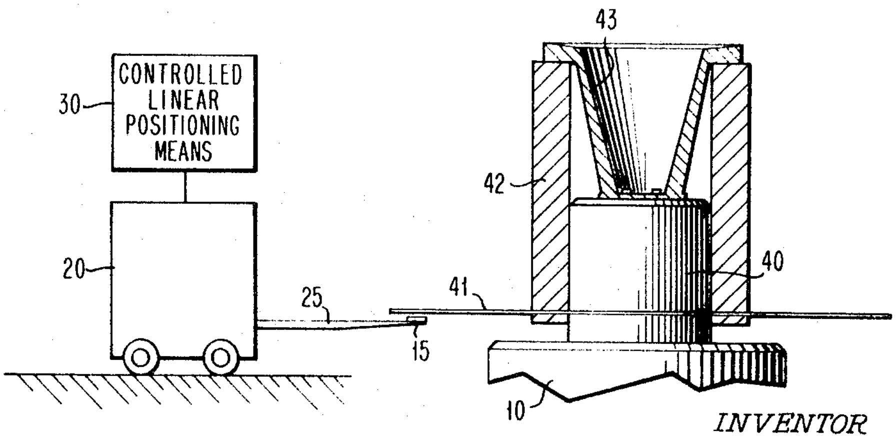
FIG. 2 is a side elevation view of the packwriter for recording signals in accordance with the method taught by this invention.

As illustrated in FIG. 2, a packwriter is shown for recording signals in accordance with the method of this invention. The packwriter comprises a rotatable spindle 10, a plurality of 20 magnetic recording heads 15 (one of which is illustrated), each head 15 having associated therewith a moveable carriage 20, a slider arm 25 mounted on carriage 20 and radially moveable with respect thereto, the arm 25 having the head 15 secured at its outer extremity, and controlled linear positioning means 30 for positioning the carriage 20. The rotatable spindle is precisely machined and balanced so as to eliminate any rotational eccentricity. The magnetic recording head 15 is a conventional "flying" head having an air-bearing surface to enable the head to fly slightly spaced from the recording surface of the disk 41.

A single magnetic head 15 is utilized in recording the predetermined signal on each of the disks comprising the pre-master disk pack, whereas all 20 heads must be aligned and utilized for recording the master disk pack. In order to precisely position the single magnetic recording head 15 at the proper radius relative to the central axis of the spindle, an optical measuring device (not shown) is used. The optical measuring device includes a central portion that is clamped to the center of the spindle 10 of the packwriter and an outwardly extending arm having an optical microscope secured at its outer extremity. The distance between the crosshairs of the microscope and the central axis of the measuring device may be precisely located by utilizing a measurement standard and corresponds to a position on a disk 41 that is substantially midway between the inner and outer diameters. The bottom surface of the microscope defines a reference surface and is located on a plane that the recording surface of the magnetic head will occupy when it is used to record the signal, or more accurately the servo track, on the magnetic disk 41 when the disk is positioned on the hub 40.

In order to align the recording gap of the magnetic head with the crosshairs of the optical microscope, the carriage 20 is coarsely moved by the linear positioning means 30 to the approximate location whereupon the slider arm 25 is moved to the exact alignment location and fixedly secured to the carriage 20. Positioning means 30 may particularly be a numerically controlled mechanism. Once the crosshairs of the optical microscope and the recording gap of the magnetic head 15 are aligned, the position is noted and recorded so that the head may be accurately returned to such position for the subsequent recording of the servo tracks upon the disks. Thereupon, the carriage 20 is retracted, thereby to move the head away from the optical microscope; and the optical measuring device is removed from the spindle 10. Thus, the magnetic recording head of the packwriter is aligned for recording the predetermined signal on the disks comprising a pre-master disk pack.

A single disk 41 is then placed on a hub 40. This disk and all other disks that are used in creating the pre-master disk pack are those having the smallest inner diameter, within the disk specification, and the hub chosen has the largest radius within the tolerance specifications so that each disk of the pre-master pack fits snugly and securely on the hub. An annular aluminum sleeve 42 is then placed on the hub and secured thereto by clamp 43. The aluminum sleeve 42 has an axial length equal to that normally occupied by the alternating spacing rings and magnetic disks in a conventional disk pack.

The clamped assembly is positioned on the packwriter spindle 10, which is then energized so that the disk is rotated at its rated speed. The magnetic head 15 is moved into its recording position, and an electrical signal is applied annularly to the rotating disk, thereby to describe a servo track. The exact information recorded in this servo track is more completely described in pending U.S. patent application entitled "Method and Apparatus For Recording and Detecting Information" by George R. Santana, Ser. No. 692,439 now U.S. Pat. No. 3,534,344, assigned to the same assignee. As disclosed therein, after the first servo track is recorded, the recording head is moved radially a distance equal to the width of a track and a second servo track is concentrically written or recorded on the disk.

After writing the adjacent, concentric, servo tracks, the head is retracted from its transducing relationship with its disk surface and the other side of the disk is recorded by a process similar to that just described. The procedure is repeated until 20 surfaces of 11 disks have the servo tracks recorded thereon.

In practice, when two adjacent tracks are written, a write-overlap occurs due to the erasure of a small portion of the first track by the later-written second track, which erasure causes the electrical center line to shift slightly from the optically observed center line between the two tracks. This write-overlap, as will be subsequently discussed, makes the determination of the electrical center line rather important, since this electrical center line is used to determine the reference track which is used to align each magnetic head of the packwriter.

A pre-master disk pack is then assembled with the 11 disks separated one from another by annular spacing rings and the rings and disks clamped as in a conventional disk pack. The outer surface of the cylindrical hub abuts the inner diameter of the disks so that it is perpendicular to the plane of the magnetic surfaces of the disks. The pre-master disk pack is then placed on the pack writer spindle 10, and the 20 packwriter magnetic heads are moved by their respective carriages to the electrical center between the two servo tracks. The center between the tracks defines a reference track and is determined in accordance with the previously discussed Santana application. As described therein, the electrical center between the tracks is that point which produces a null signal upon algebraic addition between the received signals from each recorded servo track. Thus, the packwriting heads are aligned, and the tracks they describe have identical diameters whereby to form an ideal cylinder.

After the plurality of packwriting heads are aligned in the reference cylinder whereby each head is disposed so that it reads the electrical center or reference track between the two servo tracks, they are used to generate a master disk pack. The master pack merely comprises a plurality of spaced magnetic disks, each having an annular reference track recorded thereon. In fact, a plurality of master packs are written by the aligned packwriting heads. If one of the original master packs should be destroyed, a new master pack could be recorded by simply resetting the packwriter heads to the initially used recording positions and checking the pack recorded therefrom against the remaining master disk packs.

The master disk packs are stored in a vault at the packwriter location. These packs are used to periodically check the alignment of the packwriter heads so as to insure that subsequently recorded head-alignment packs recorded by the packwriter are uniform and in agreement with the master packs. These head-alignment disk packs are then sent to all computer installations for precisely aligning each of the read-write magnetic heads of each magnetic file used. This assures interchangeability of any disk pack with any magnetic disk storage file.

From the above, it will be seen that there has been described a method for aligning magnetic heads for use in recording a master disk pack which fulfills all the objects and advantages set forth above. While there has been described what is at present considered to be a preferred embodiment of the invention, it will be understood that various modifications may be made therein, and it is intended to cover in the appended claims all such modifications as fall within the true spirit and scope of the invention.

What is claimed is:

1. A method for aligning transducers of a packwriter comprising the steps of:

1. generating a pre-master disk pack by the method comprising the steps of:
   a. locating a transducer of said packwriter accurately at the location of the reference cylinder by means of a locating device external of said packwriter;
   b. recording the input value of the positioning means for said transducer for said location;
   c. selecting disks and a hub to be used in said pre-master disk pack, the tolerances associated with said selected disks and said hub being selected to provide a snug and secure fit for each of said selected disks on said selected hub;
   d. affixing one of said selected disks to said hub at the normal position of the disk associated with said aligned transducer of step (a) to form an assembly;
   e. mounting said assembly on the spindle of said packwriter;
   f. rotating said assembly at its rated speed;
   g. inputting said recorded input value of step (b) into said positioning means to locate said transducer at said reference cylinder;
   h. recording on said selected disk on said hub information that defines the location of said reference cylinder;
   i. repeating steps (d–h) for the reverse side of said selected disk;
   j. repeating steps (d–i) for each of the selected disks to be used in said pre-master disk pack;
   k. mounting all said selected disks on said hub to form a pre-master disk pack;
2. mounting said pre-master disk pack in said packwriter for defining said reference cylinder for all transducers in said packwriter;
3. rotating said pre-master disk pack at said rated speed;
4. inputting into said positioning means the input value associated with said reference cylinder; and
5. aligning all said transducers of said packwriter to said reference cylinder by means of said recorded location information recorded on each side of each of said selected disks in said pre-master disk pack.

* * * * *